Oct. 16, 1934.                R. GUNN                      1,976,723
                   ALTERNATING CURRENT INDUCTOR COMPASS
                      Filed Dec. 17, 1931       2 Sheets-Sheet 1
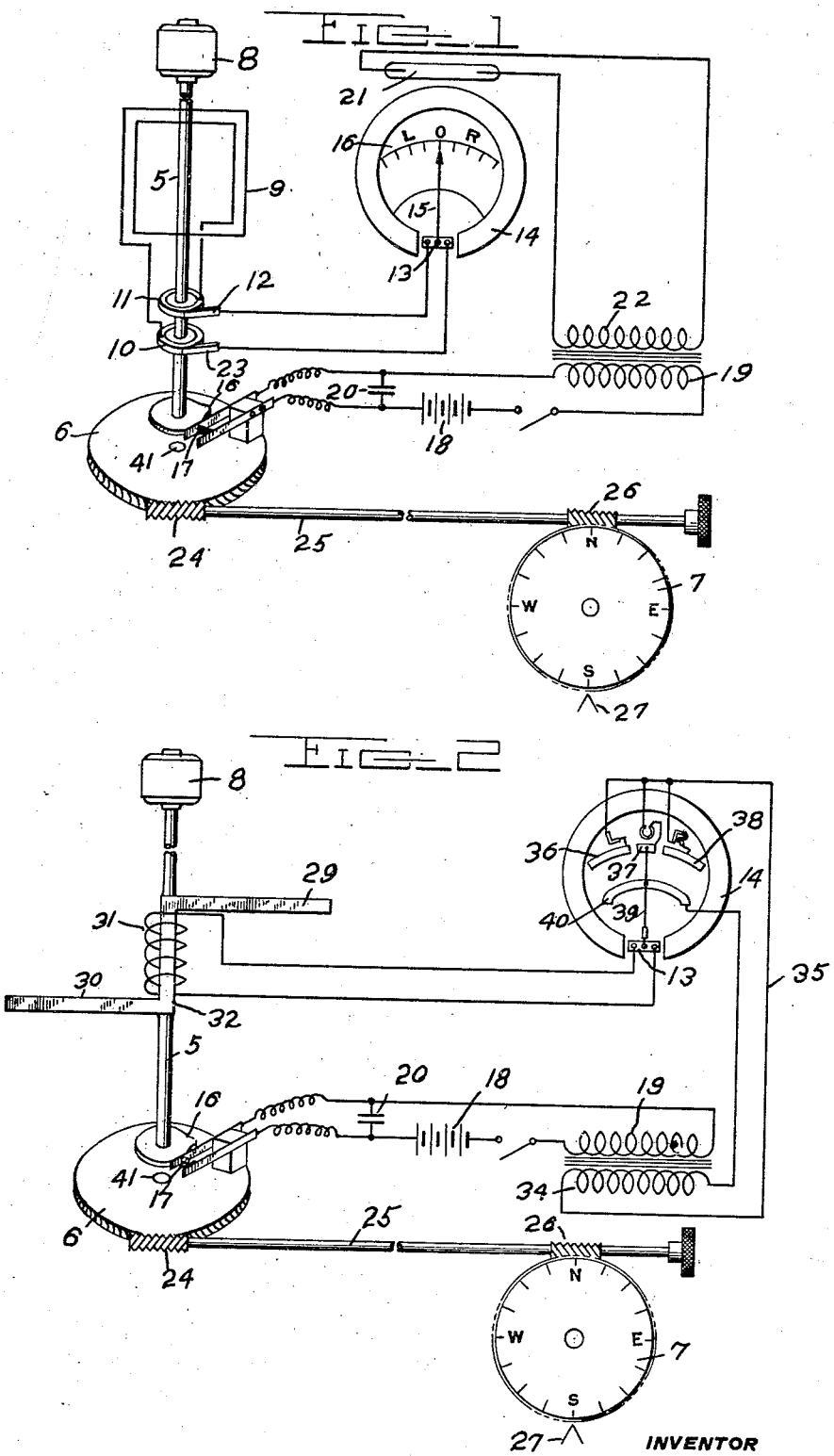
INVENTOR
Ross Gunn
BY
ATTORNEY

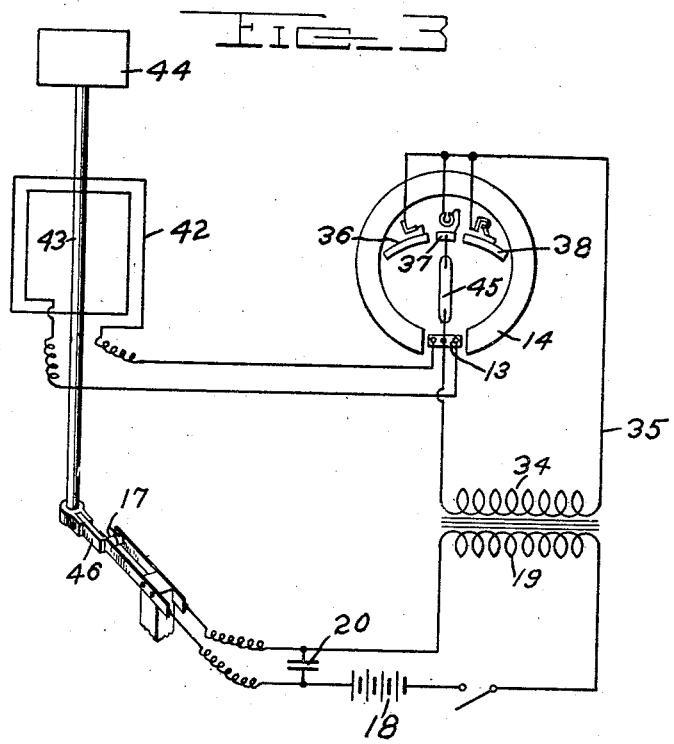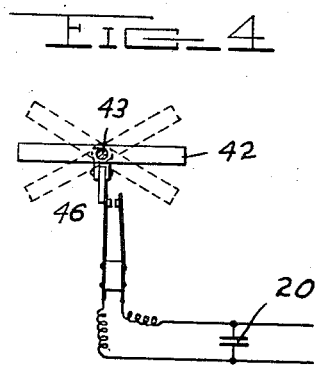

Patented Oct. 16, 1934

1,976,723

UNITED STATES PATENT OFFICE 1,976,723

ALTERNATING CURRENT INDUCTOR COMPASS

Ross Gunn, Washington, D. C.

Application December 17, 1931, Serial No. 581,857

15 Claims. (Cl. 33—204)

(Granted under the act of March 3, 1883, as amended April 30, 1928; 370 O. G. 757)

This invention relates to a compass actuated by currents induced by rotating an inductor member in the earth's magnetic field.

It is the object of my invention to provide an inductor compass having associated with the inductor mechanism an accurately synchronized indicating device to show the instantaneous course of a craft on which the compass is mounted and simultaneously make known whether the craft is or is not on the desired course, and if not then to show the deviation therefrom.

With the above and other objects in view, the invention consists in the construction, combination and arrangement of parts as will be hereinafter more fully described.

Reference is to be had to the accompanying drawings forming a part of this specification in which like reference characters indicate corresponding parts throughout the several views and in which Fig. 1 shows diagrammatically one embodiment of my invention;

Fig. 2 shows a modification thereof having a different type of inductor mechanism and luminous indicator;

Fig. 3 is a schematic representation of an embodiment having an oscillable instead of rotatable inductor;

Fig. 4 is a detail of a portion of the form of my invention shown in Fig. 3.

It is well known that when a coil is disposed with its axis vertical and is rotated in the earth's magnetic field an alternating current is generated in the coil, the current being a maximum when the plane of the coil is parallel to the magnetic lines and substantially zero when the plane is at right angles to those lines. If an observer on a craft carrying one of these compasses knows the orientation of the coil with respect to his craft and phase position of the coil he can determine the course being followed by the craft.

In Fig. 1 the shaft 5, adjusting disk 6, and indicating disk 7 are suitably mounted in a frame (not shown) carried by a universal joint to permit shaft 5 to remain in a vertical position at all times. A motor 8 is connected to drive shaft 5 at a constant speed to rotate coil 9, mounted on shaft 5, in the earth's magnetic field.

Slip rings 10 and 11 on shaft 5 are connected to the terminals of coil 9. Brushes 23 and 12 contact these rings and are connected to a movable coil 13 suitably mounted between the poles of a permanent magnet 14. A pointer 15 is carried by coil 13 to move over a scale 16, whereon are marked O, L, and R, to indicate respectively "on," "left," or "right," with respect to the desired course. During each complete rotation of the coil 9, pointer 15 moves from O to R to L and back to O under the impulse of the alternating current generated in coil 9.

On shaft 5 is a cam 16 to cause the resiliently mounted contact points 17 to touch and close a circuit through battery 18 and transformer primary 19. A condenser 20 is connected across the contacts 17 to prevent injury thereto by the heavy current set up when the circuit is opened. A flash lamp 21 is connected to secondary 22 of the transformer and is positioned to illuminate the scale 16 each time the circuit through contacts 17 is closed.

Contacts 17 are mounted on a rotatable disk 6 to vary the part of the cycle of coil 9 at which the circuit through the contacts will be closed. As shown, this adjustment may be effected by a worm 24 on shaft 25 engaged with suitable gear teeth on the periphery of disk 6. A second worm 26 on shaft 25 engages gear teeth on disk 7, on which disk are marks designating the points of the compass.

It is evident that by turning shaft 25 the disk 6 may be caused to rotate about its support 41 and so move the contacts 17 to vary the time of closing the circuit therethrough by cam 16. The change in position of the contacts 17 is so coordinated with the rotation of disk 7 that the flash of lamp 21 will occur when the pointer 15 is on O if the craft is following the course indicated on the disk 7 by the fixed reference mark 27, but if it deviates therefrom the flash will occur when the pointer is between O and either L or R, depending upon whether the craft is to left or right of the set course. The magnitude of the displacement of the pointer from O at the time of the flash measures the degree of deviation from the course.

The form of the invention shown in Fig. 2 is similar to that of Fig. 1 except as to the inductor element and the flashing device. In this form, instead of a rotating coil the current is induced by arms 29 and 30 carried by the shaft 5 with a stationary coil 31 around the portion 32 that connects the arms. The arms and the portion 32 have high magnetic permeability and low hysteritic loss, and as they revolve in the earth's magnetic field currents are set up in coil 31 by the changing flux through portion 32, the currents so generated moving the coil 13 between the poles of magnet 14. The letters L, O, and R are luminous discharge tubes which will glow when a current is passed through them. One terminal of each of the letters is connected to the secondary 34 of the transformer by wire 35, the other terminals being connected to the contact members 36, 37, and 38, respectively. Pointer 39, carried by coil 33, serves to close the circuit between the contact members 36, 37, 38, and the contact member 40 which is connected to the other terminal of the transformer secondary.

The modification of my invention illustrated in Fig. 3 has some features found in each of the preceding two and some found in this one only. Inductor coil 42 on shaft 43 is not rotated, but is caused to oscillate back and forth about a median position by suitable mechanism 44, the inductor coil being connected to a movable coil 13 mounted between the poles of magnet 14 and having mounted on it a pointer 45. Pointer 45 is connected to one terminal of the transformer secondary 34 and closes, through the contacts 36, 37, and 38, the circuits through the letters L, O, and R, each of which is connected to transformer secondary 34 by wire 35. Contact points 17 are moved together by contact arm 46 that is fixed in position on shaft 43 by a set screw to permit of its being adjusted to various relative positions with respect to the plane of coil 42. As shown in Fig. 4 the arm 46 will close the circuit through battery 18 and transformer primary 19 each time the pointer passes the letter O if the craft is following the course set; otherwise, the divergence therefrom will be indicated by the position of the pointer at the instant when the flash occurs.

The operation of my invention is as follows:

The current generated in coil 9 will move the pointer constantly back and forth over the scale 13. Shaft 25 is turned until the desired course is indicated on disk 7 by reference mark 27, which will simultaneously position the contacts 17 to be brought together and cause lamp 21 to flash at the instant the pointer is over the letter O so long as the craft follows the set course. If the craft deviates from that course the relative position of coil 9 will be changed with respect to the magnetic lines of the earth's field and the pointer will be either to the left or the right of the O when the lamp flashes, depending upon the direction of divergence from the course. The pilot, upon observing that the craft is off the course, can make the necessary change of direction to bring it back to the proper line of travel. The synchronization of the flash of lamp 21 with the movement of the pointer thus keeps the pilot constantly apprised of his relation to the desired course.

It will be understood that the above description and accompanying drawings comprehend only the general and preferred embodiment of my invention and that various changes in construction, proportion and arrangement of parts may be made within the scope of the appended claims without sacrificing any of the advantages of my invention.

The invention described herein may be manufactured and used by or for the Government of the United States of America for governmental purposes without the payment of any royalties thereon or therefor.

Having thus described my invention, what I claim is:

1. In a device of the class described, a rotatable shaft, a coil thereon, a slip ring connected to each terminal of said coil, a brush in contact with each of said rings, a movable coil connected to said brushes, a pointer carried by said movable coil, a permanent magnet between the poles of which the said movable coil is mounted, a scale over which said pointer is movable, a rotatable disk, contact points mounted on said disk, a cam on said shaft adapted to move said points together, a battery and the primary coil of a transformer connected in series between said points, a condenser connected across said points, a secondary coil of said transformer, a glow lamp connected to said secondary and disposed to illuminate said scale, a second rotatable disk having thereon directional indices, and means to rotate simultaneously both of said disks.

2. In a device of the class described, a rotatable shaft, oppositely extending arms connected by an intermediate portion carried by said shaft, a coil around said intermediate portion, a movable coil connected to the aforesaid coil, a permanent magnet between the poles of which the said movable coil is mounted, a plurality of indicia each formed of a luminescent tube, a contact member connected to each of said indicia, an arcuate contact segment, a secondary coil of a transformer to which said arcuate contact segment and each of said indicia are individually connected, a pointer carried by said movable coil in contact with said arcuate contact segment and contactible with each of said other contact segments, a rotatable disk, a pair of contact points mounted thereon, a cam on said shaft adapted to move said contact points together, a battery and the primary coil of said transformer connected in series between said points, a condenser connected across said points, a second rotatable disk having directional indices thereon, and means to rotate both of the said disks simultaneously.

3. In a device of the class described, oscillatory shaft, a coil thereon, a movable coil connected to the terminals of the said coil a permanent magnet between the poles of which the said movable coil is mounted, a plurality of indicia each formed of a luminescent tube, a contact segment connected to each of said indicia, a conductive pointer carried by said movable coil contactible with each of said segments and connected to the secondary coil of a transformer, means connecting each of said indicia with the said secondary coil; a pair of contact points, a battery and the primary coil of said transformer connected in series between said points; a condenser connected across said points, and an arm on said shaft disposed to move said contact points together.

4. In a device of the class described, a rotatable shaft, means carried thereby to generate current by rotation in the earth's magnetic field, a movable coil connected to said means to receive current therefrom, means to set up a magnetic field around said coil, a pointer carried by said coil, a scale over which said pointer moves, a cam on said shaft, contact points disposed to be moved together by said cam, a source of current and the primary coil of a transformer connected in series with said points, an illuminating device connected to the secondary coil of said transformer and disposed to illuminate said scale, and means to move said points to be contacted by said cam at different points in the rotation of said cam.

5. In a device of the class described, a rotatable shaft, means associated therewith to generate current by rotation in the earth's magnetic field, a movable coil connected to said means to receive current therefrom, means to set up a magnetic field around said coil, a pointer carried by said coil, a plurality of luminescent indicia, a secondary coil of a transformer, means including said pointer to close the circuit through any one of said indicia and said secondary coil, a primary coil of said transformer, means operable by said shaft to send periodic current impulses through said primary coil, and means to vary the time of actuation of said last mentioned means.

6. In a device of the class described, a shaft movable about its longitudinal axis, means carried by said shaft to generate current by movement through the earth's magnetic field, a movable coil connected to receive current from said means, a pointer carried by said coil, a plurality of luminescent indicia, a secondary coil of a transformer, means including said pointer to close the circuit through any one of said indicia, and said secondary coil, a primary coil of said transformer, and means operable by said shaft to send periodic current impulses through said primary coil.

7. In a navigating instrument, means to generate current by cutting lines of the earth's magnetic field, a plurality of directional indicia, indicator means moved continuously adjacent said indicia by said current the displacement of said means from a zero position being definitely related to the phase angle of said generating means, means to illuminate at a predetermined point in each cycle of said generating means that one of said indicia nearest said indicator means and means operating synchronously with said generating means to flash said illuminating means.

8. In a navigating instrument, symbols to indicate "on," "left" or "right" with respect to a desired course, means to generate current by cutting lines of the earth's magnetic field, indicator means moved adjacent said symbols by said current, the displacement of said means from a zero position being definitely related to the phase angle of said generating means and means operating synchronously with said generating means to illuminate one of said symbols at a predetermined point in each cycle of said generating means whereby is indicated the course of a craft on which said instrument is mounted with respect to said desired course.

9. In a navigating instrument, means to generate current by cutting the lines of the earth's magnetic field, a plurality of directional indicia, means movable continuously adjacent said indicia by and in synchronism with said generating means by said current, and means to cause transitory illumination of said indicia at a predetermined phase position of said generating means in each cycle of said generating means, whereby is indicated the position of said movable means with respect to said indicia at the time of occurrence of said phase position.

10. In a navigating instrument, means to generate current by cutting lines of the earth's magnetic field, a plurality of directional indicia, means movable continuously adjacent said indicia by said current, and means operatively connected to said generating means and adjustable to illuminate at a predetermined point in each cycle of said generating means that one of said indicia nearest said movable means.

11. In a navigating instrument, symbols to indicate "on", "left" or "right" with respect to a desired course, means to generate current by cutting lines of the earth's magnetic field, means movable adjacent said symbols by said current, and means operatively connected to said generating means to illuminate one of said symbols at a predetermined point in each cycle of said generating means, whereby is indicated the course of a craft on which said instrument is mounted with respect to said desired course.

12. In a navigating instrument, means to generate current by cutting lines of the earth's magnetic field, a plurality of directional indicia, means movable continuously adjacent said indicia and in synchronism with said generating means by said current, and means operatively connected to said generating means to cause transitory illumination of said indicia at a predetermined phase position of said generating means in each cycle of said generating means, whereby is indicated the position of said movable means with respect to said indicia at the time of occurrence of said phase position.

13. In a navigating instrument, means to generate current by cutting lines of the earth's magnetic field, a plurality of directional indicia, means responsive to said current including a member movable thereby and an indicator movable adjacent said indicia operatively connected to said movable member, and means operatively connected to said generating means adjustable to illuminate at a predetermined point in each cycle of said generating means that one of said indicia nearest said indicator.

14. In a navigating instrument, symbols to indicate "on", "left" or "right" with respect to a desired course, means to generate current by cutting lines of the earth's magnetic field, means responsive to said current including a member movable thereby and an indicator movable adjacent said symbols operatively connected to said movable member and means operatively connected to said generating means to illuminate one of said symbols at a predetermined point in each cycle of said generating means whereby is indicated the course of a craft on which said instrument is mounted with respect to said desired course.

15. In a navigating instrument, means to generate current by cutting lines of the earth's magnetic field, a plurality of directional indicia, means responsive to said current including a member movable thereby and an indicator movable adjacent said indicia operatively connected to said movable means, and means operatively connected to said generating means to cause transitory illumination of said indicia at a predetermined phase position of said generating means in each cycle generating means, whereby is indicated the position of said movable means with respect to said indicia at the time of occurrence of said phase position.

ROSS GUNN.